United States Patent
Lakamp et al.

(10) Patent No.: US 7,464,271 B2
(45) Date of Patent: Dec. 9, 2008

(54) SYSTEMS AND METHODS OF PROVIDING CONTENT PROTECTION FOR DIGITAL VIDEO PRODUCTS

(75) Inventors: Brian David Lakamp, Malibu, CA (US); David Clifford Blight, Oceanside, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 691 days.

(21) Appl. No.: 11/046,472

(22) Filed: Jan. 28, 2005

(65) Prior Publication Data
US 2006/0075243 A1  Apr. 6, 2006

Related U.S. Application Data

(60) Provisional application No. 60/615,898, filed on Oct. 4, 2004.

(51) Int. Cl.
*H04L 9/00* (2006.01)
*H04N 7/167* (2006.01)

(52) U.S. Cl. ............... 713/176; 380/200; 380/201

(58) Field of Classification Search ......... 380/200–203, 380/210, 217; 713/176; 726/27, 31–33; 705/57–59
See application file for complete search history.

(56) References Cited

U.S. PATENT DOCUMENTS

| | | | |
|---|---|---|---|
| 6,226,618 B1 * | 5/2001 | Downs et al. | 705/1 |
| 6,671,387 B1 | 12/2003 | Chen et al. | |
| 6,700,989 B1 * | 3/2004 | Itoh et al. | 382/100 |
| 6,735,699 B1 * | 5/2004 | Sasaki et al. | 726/28 |
| 6,961,853 B2 | 11/2005 | Marshall | |

* cited by examiner

*Primary Examiner*—Hosuk Song
(74) *Attorney, Agent, or Firm*—Crowell & Moring LLP

(57) ABSTRACT

A digital watermark is affixed to an existing image file prior to being copied onto a destination media. In one embodiment, the image file is encrypted using content scrambling system (CSS) encryption. In another embodiment, the image file is also compressed prior to being copied onto the destination digital video media. A unique identification code associated with an intended recipient may be embedded into the digital watermark. In one embodiment, this unique identification code is stored in a database, along with information particular to the intended recipient. In this fashion, the identity of the intended recipient of the destination digital video media may be determined.

31 Claims, 3 Drawing Sheets

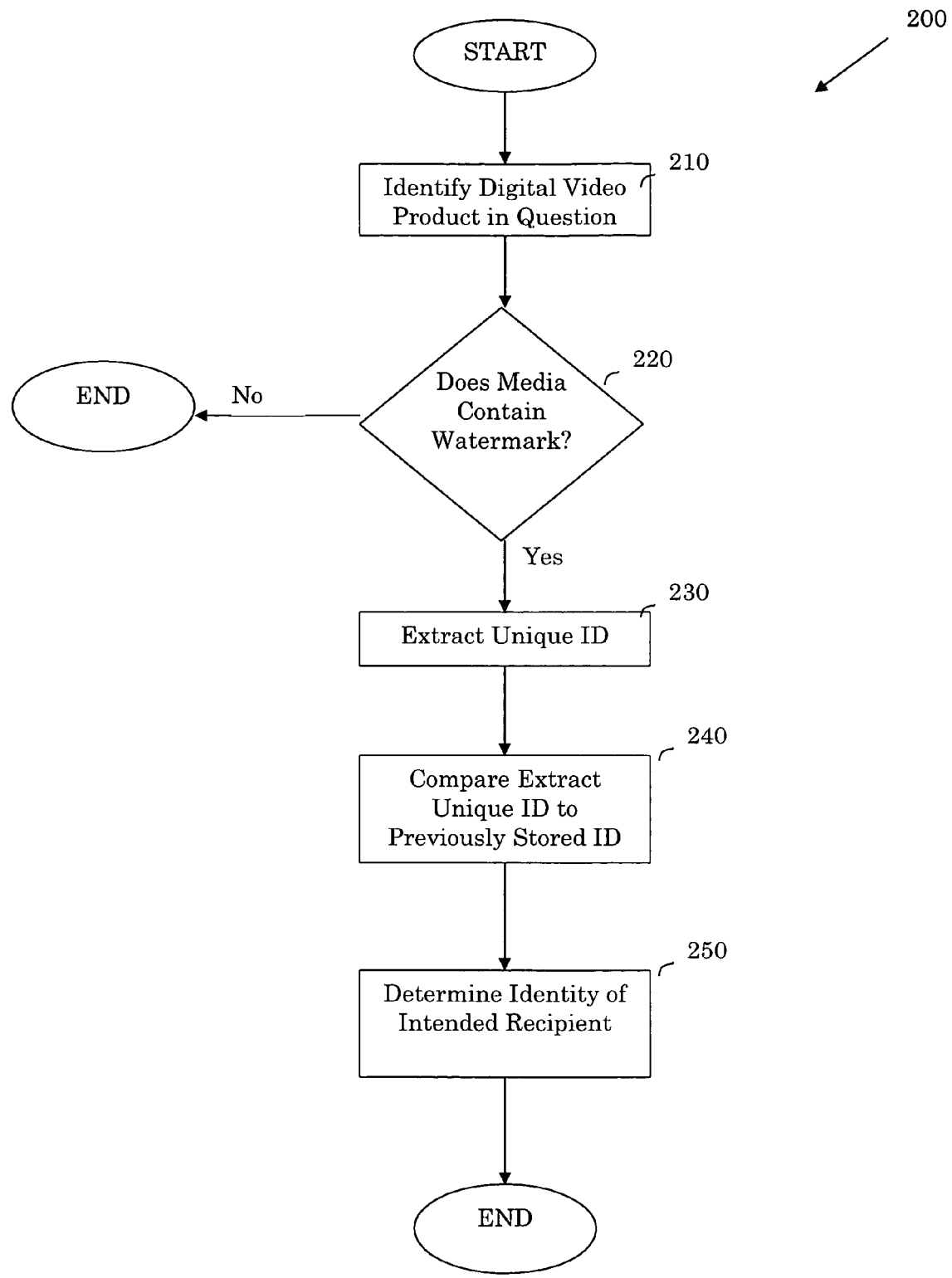

SYSTEMS AND METHODS OF PROVIDING CONTENT PROTECTION FOR DIGITAL VIDEO PRODUCTS

CROSS REFERENCE TO RELATED APPLICATION

This application claims priority to U.S. Provisional Patent Application Ser. No. 60/615,898 filed on Oct. 4, 2004.

FIELD OF THE INVENTION

This invention relates generally to protecting multimedia content, and in particular to identifying unauthorized users of digital video products.

BACKGROUND OF THE INVENTION

Before a movie is to be released to the general public on Digital Versatile Disc (DVD), the movie is often first released on for promotional screenings and awards events on DVD. However, in recent years piracy of these recordings has increased dramatically. Thus, it is desirable to adopt measures to secure DVD recordings of films distributed in pre-release promotional and awards screenings.

One of the problems with proposed measures for securing DVD recordings is that, since certain users are authorized to view the recordings, the DVD should be playable in a commercial player. In addition, the recording should be of appropriate quality so as to not disrupt the enjoyment of the authorized user. While DVDs are currently encrypted, software for breaking such encryption is readily available. Moreover, no encryption approach can prevent illegal copying through the analog output of a DVD player or stop circulation of unauthorized copies from person to person. Accordingly, there is a need for an improved system and method for providing content protection of digital video products.

SUMMARY OF THE INVENTION

Systems and methods for providing content protection for digital video products. In one embodiment, a method includes inserting a digital watermark into an image file, wherein the digital watermark includes a unique identification code. The method further includes associating the unique identification code with an intended recipient, encrypting the image file, and copying the image file to a digital video product.

Other aspects, features, and techniques of the invention will be apparent to one skilled in the relevant art in view of the following detailed description of the invention.

BRIEF DESCRIPTION OF THE DRAWINGS

FIG. 2 is one embodiment of a flow diagram of determining the identity of the original intended recipient of the digital video product of FIGS. 1A-1B.

DETAILED DESCRIPTION OF THE EXEMPLARY EMBODIMENTS

Figure 1A:
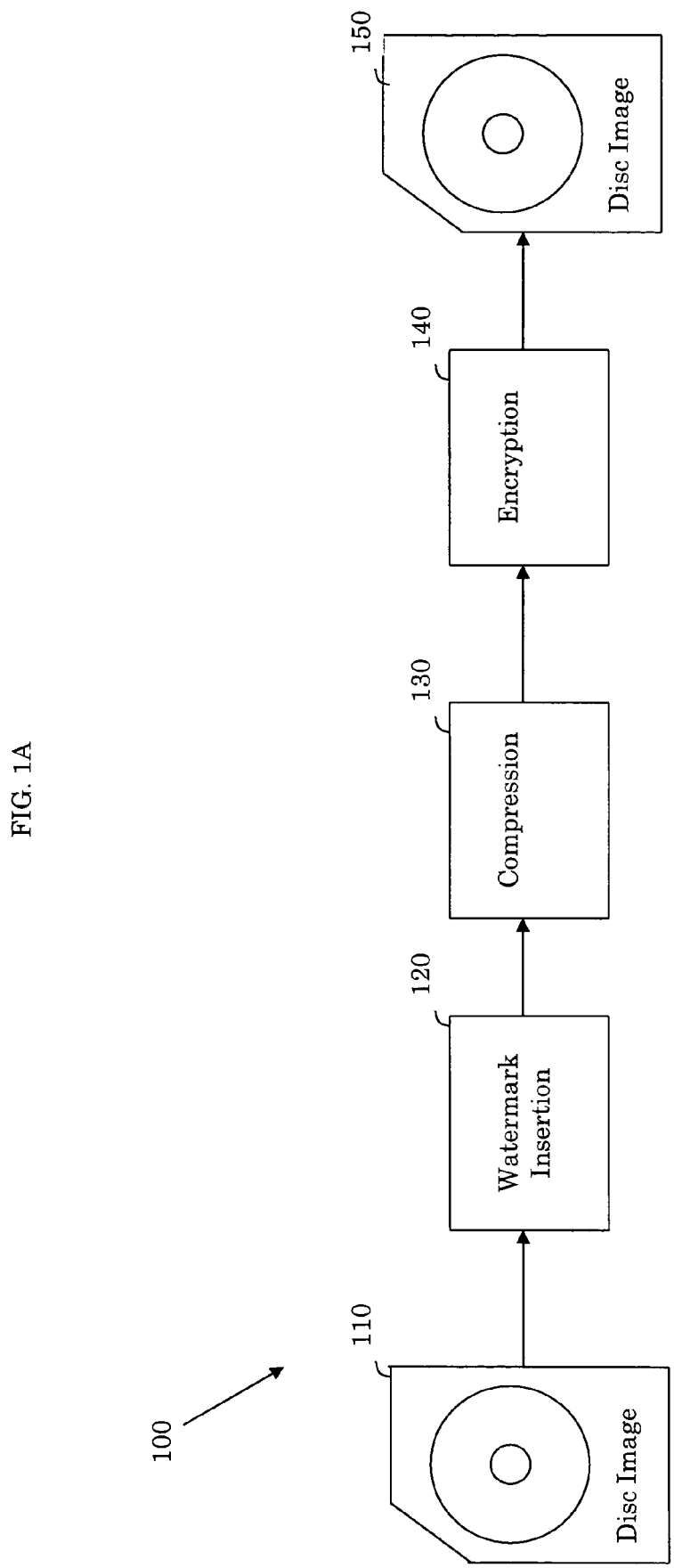
FIG. 1A depicts one embodiment of how a digital video product consistent with the principles of the invention may be produced.

One aspect of the invention is to affix a digital watermark to an existing image file prior to being copied onto a destination media. In one embodiment, the image file is encrypted using content scrambling system (CSS) encryption. In another embodiment, the image file is also compressed prior to being copied onto the digital video media.

Another aspect of the invention is to include a unique identification code in the digital watermark. In one embodiment, this unique identification code may be associated (or otherwise linked) with the intended recipient of the destination media. In one embodiment, the unique identification code is stored in a database, along with information particular to the intended recipient. In this fashion, the unique identification code may be looked up to determine the intended recipient of the destination media in question. Thus, the presence of the digital watermark may dissuade the intended recipient of the image file from disseminating it without authorization since the embedded unique identification code may be used to trace the image file back to the intended recipient.

Yet another aspect of the invention is to provide different methods of implementing the invention depending on varying applications. For example, when using watermarking technology which works on only uncompressed image files, the digital watermark may be affixed to the image file prior to compression and encryption. In contrast, when using watermarking technology which works on compressed image files, the digital watermark may be affixed after compression.

One possible application of the invention is in the area of pre-release screening copies of DVD titles. Such screening copies of the DVD titles are often made available to a very limited number of individuals for promotional purposes. However, such screening titles may be copied and made illegally made available to others, such as through an online peer-to-peer pirate channel. To that end, the present invention may be used to forensically determine the identity of the original intended recipient of an unauthorized copy of a DVD title.

Another possible application of the invention is to enable consumers to perform the process of embedding a watermark into commercial content, encrypting the content, and then burning it to a disk on the consumer's premises. For example, a client application could insert a watermark and then burn content (protected by a robust DRM during the insertion and subsequent burning process) to a disk, DVD format, or otherwise.

Video disc production typically begins with an image file, which may be a DVD image file. This image file represents the exact content that is to be copied to the destination video product (e.g., DVD). In other words, the image file is a grouping of all the data that is to be placed onto a destination disc. While in many cases, such an image file may reside on the hard drive of a computer system that is responsible for transferring data to the destination disc, it should be appreciated that other sources of the image file may equally be used (e.g., tape, etc.).

Referring now to FIG. 1A, the video disc production process involved an image file, which in this embodiment is located on source storage device 110. In one embodiment, source storage device 110 is a hard drive, it should equally be appreciated that it may be a tape drive, as well as any other storage device capable of storing data. As mentioned above, the watermarking technology to be employed may dictate what order the image file is to be compressed, encrypted and watermarked. In the embodiment of FIG. 1A, the watermarking technique being used requires an uncompressed and unencrypted source image file. Accordingly, a digital watermark may be inserted into the uncompressed and unencrypted image file at block 120. It should be appreciated that the watermarking process may proceed in accordance with the specifications of any watermarking vendor. In one embodiment, a unique identification code may be embedded in the digital watermark. As will be described in more detail below, this unique identification code may be used to determine whether the digital video product has been passed along or otherwise made available to unauthorized users.

Thereafter, at block 130 the image file may be compressed prior to burning onto a digital video product (e.g., DVD). In one embodiment, this compression is MPEG-2 compression, but may similarly be other known types of data compression.

Continuing to refer to FIG. 1A, the image file, which is now watermarked and compressed, may then be encrypted at block 140. In one embodiment, the method used is CSS encryption, although other forms of encryption may similarly be used. CSS is an encryption system that most commercial DVDs use. It's alleged purpose is to stop piracy, however it also enforces region coding, non-skippable FBI warnings or commercials and many other artificial restrictions. CSS uses various keys, basically a string of characters that are used to authenticate the validity of the disc that the DVD player is attempting to read.

At this point, the watermarked, compressed and encrypted image file may be burned onto a destination media in destination storage device 150. In one embodiment, the destination media is a DVD, although other forms of digital video products may similarly be used.

Labeling information may optionally be displayed or printed on the destination media, or otherwise associated with the destination media. For example, the label may be a unique label (sticker) for the disc itself, a unique box label and/or a mailing label for disc distribution. In one embodiment, the information which is to be printed on the label may include the unique identification code that was embedded into the digital watermark at block 120. In addition, intended recipient information may similarly be included on the label.

In one embodiment, the unique identification code and recipient information may be stored and maintained in a database (not shown). As will be described below, this information may later be consulted to determine if a digital video product has been passed along or otherwise fallen into the hands of an unauthorized user.

Figure 1B:
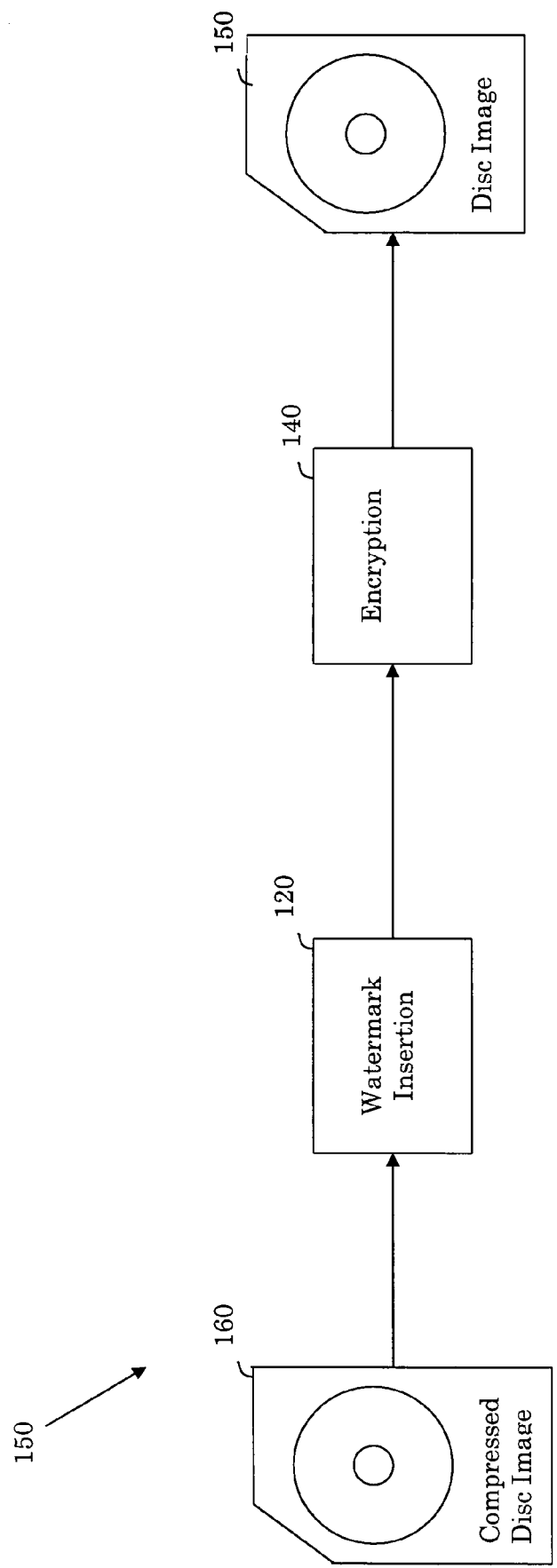
FIG. 1B depicts another embodiment of how a digital video product consistent with the principles of the invention may be produced.

Referring now to FIG. 1B, in this embodiment the video disc production process begins with an already compressed image file located on source hard drive 160. Since the image file is compressed prior to the watermarking process, the watermarking technology to be employed at block 120 should be compatible with compressed source image files. Then, at block 140, the now-compressed and watermarked image file may then be encrypted at block 140. As with the embodiment of FIG. 1A, the method used may be CSS encryption, or other known forms of encryption.

At this point, the watermarked, compressed and encrypted image file may be burned onto a destination media in destination storage device 150. In one embodiment, the destination media is a DVD, although other forms of digital video products may similarly be used.

Regardless of video disc production process employed, one aspect of the invention is to provide a digital video product which is encoded with a unique identification code usable to determine if a user is the actual intended recipient of the media. If the intended recipient is aware of the embedded identification code, this fact would also serve as a deterrent from passing along or otherwise making the digital video product available to others. In one embodiment, this is done by storing the unique identification code, which was encoded onto the digital video product, in a database along with information particular to the intended recipient. In this fashion, a database lookup may be performed to determine the identity of the intended recipient given a unique identification code. To that end, FIG. 2 depicts one embodiment of a process 200 for forensically determining the original intended recipient of a digital video product using a unique identification code embedded into a digital watermark.

Process 200 begins at block 210 with the identification of a digital video product which may have been made accessible to individuals other than the original intended recipient. In one embodiment, this may involve identifying a restricted-release video product which is being made available on an unauthorized peer-to-peer (P2P) channel, or some other network configuration capable of sharing digital media.

Once the digital video product is identified or otherwise detected, it is first necessary to determine if the product contains a digital watermark having an ID code embedded therein (block 220). If not, process 200 terminates and the identification of the intended recipient will not be possible. If, on the other hand, the product does contain a digital watermark with an ID code, then process 200 will continue to block 230 where the unique ID code may be read/extracted from the media. In one embodiment, this may be performed by a forensic lab using watermark detection software which may extract the watermark and/or the unique ID code straight from the video product stored, for example, on a computer hard drive. Numerous other forms of detection are also possible.

Regardless of how the unique ID is determined, once known it may be compared to the previously stored identification code. This may be done, for example, by performing a database lookup on the identification code field. From this, the identity of the intended recipient may be determined at block 250. While in one embodiment, the forensic lab may manually compare the extracted ID code to a list of intended recipients in a database, in another embodiment the watermark extraction software may upload the ID code to a remotely located server where the comparison operation of block 240 may be performed on the server side using a global database, for example. The remote server may then return the name (or other identifying information) of the intended recipient to the lab.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method comprising:

inserting a digital watermark into an image file, wherein said digital watermark includes a unique identification code;

associating said unique identification code with an intended recipient;

storing information in a database representative of said association between the unique identification code and said intended recipient;

encrypting said image file; and copying said image file to a digital video product.

2. The method of claim 1, further comprising distributing said digital video product to said intended recipient.

3. The method of claim 1, wherein encrypting comprising encrypting said image file with content scrambling system encryption.

4. The method of claim 1, wherein inserting said digital watermark occurs prior to said encrypting the image file.

5. The method of claim 1, wherein said image file is a digital versatile disc image, and said copying comprises burning said digital versatile disc image onto a digital versatile disc.

6. The method of claim 1, further comprising compressing said image file prior to inserting said digital watermark.

7. The method of claim 6, wherein said compressing comprises compressing said image file using MPEG compression.

8. The method of claim 6, wherein said compressing occurs prior to said encrypting the image file.

9. The method of claim 1, further comprising:
viewing said image file from said digital video product;
detecting said digital watermark;
accessing said unique identification code in said digital watermark; and,
identifying said intended recipient using said unique identification code.

10. The method of claim 1, further comprising:
detecting said digital watermark using a user's digital versatile disc player;
extracting said unique identification code from said digital watermark; and,
comparing said unique identification code to said stored information to determine if said user is the intended recipient.

11. The method of claim 10, further comprising:
affixing a label to said digital video product containing at least one of said unique identification code and said intended recipient; and
comparing said label with said stored information to determine if said digital video product has been tampered with.

12. The method of claim 1, further comprising performing a database lookup using said unique identification code to determine an identity of said intended recipient.

13. A system comprising:
a source digital video product containing an image file;
means for inserting a digital watermark into an image file, wherein said digital watermark includes a unique identification code associated with an intended recipient;
a database for storing information which associates the unique identification code and said intended recipient;
means for encrypting said image file; and
means for copying said image file to a destination digital video product.

14. The system of claim 13, wherein said destination digital video product is distributed to said intended recipient.

15. The system of claim 13, wherein said means for encrypting comprising means for encrypting said image file with content scrambling system encryption.

16. The system of claim 13, wherein said image file is provided to said means for inserting said digital watermark prior to said means for encrypting the source image file.

17. The system of claim 13, wherein said image file is a digital versatile disc image, and said means for copying comprises means for burning said digital versatile disc image onto a digital versatile disc.

18. The system of claim 13, further comprising means for compressing said image file prior to said means for inserting said digital watermark.

19. The system of claim 18, wherein said means for compressing comprises means for compressing said image file using MPEG compression.

20. The system of claim 19, wherein said means for compressing occurs prior to said means for encrypting the image file.

21. The system of claim 13, further comprising:
means for viewing said image file from said destination digital video product;
means for detecting said digital watermark; and
means for accessing said unique identification code in said digital watermark, wherein said unique identification code is usable to identify said intended recipient.

22. The system of claim 13, further comprising:
means for detecting said digital watermark using a user's digital versatile disc player;
means for extracting said unique identification code from said digital watermark; and,
means for comparing said unique identification code to said stored information to determine if said user is the intended recipient.

23. The system of claim 22, further comprising a label which is affixed to said destination digital video product, said label to contain at least one of said unique identification code and said intended recipient information, and wherein said label is compared to said stored information to determine if the user is the intended recipient.

24. The system of claim 13, further comprising a means for performing a database lookup using said unique identification code to determine an identity of said intended recipient.

25. A method comprising:
inserting a digital watermark into a DVD image file, wherein said digital watermark includes a unique identification code;
encrypting said DVD) image file;
copying said DVD image file to a digital video product;
storing said unique identification code and an intended recipient of said digital video product in a database; and
accessing said database to determine if a user of said digital video product is the intended recipient.

26. The method of claim 25, wherein encrypting comprising encrypting said DVD image file using content scrambling system encryption.

27. The method of claim 25, wherein inserting said digital watermark occurs prior to said encrypting the DVD image file.

28. The method of claim 25, further comprising compressing said image file prior to inserting said digital watermark.

29. The method of claim 28, wherein said compressing comprises compressing said image file using MPEG compression.

30. The method of claim 29, wherein said compressing occurs prior to said encrypting the image file.

31. The method of claim 25, further comprising:
viewing said digital video product;
detecting said digital watermark;
accessing said unique identification code in said digital watermark; and,
looking up said unique identification code in said database to identify the intended recipient.

* * * * *